(12) United States Patent
Ikari

(10) Patent No.: US 11,330,146 B2
(45) Date of Patent: May 10, 2022

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Daiki Ikari, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/127,583

(22) Filed: Dec. 18, 2020

(65) Prior Publication Data
US 2021/0195059 A1 Jun. 24, 2021

(30) Foreign Application Priority Data
Dec. 20, 2019 (JP) .............................. JP2019-230916

(51) Int. Cl.
*H04N 1/60* (2006.01)
*H04N 1/409* (2006.01)
*H04N 1/00* (2006.01)
*H04N 1/407* (2006.01)

(52) U.S. Cl.
CPC ....... *H04N 1/4095* (2013.01); *H04N 1/00005* (2013.01); *H04N 1/00209* (2013.01); *H04N 1/00795* (2013.01); *H04N 1/4072* (2013.01); *H04N 2201/0091* (2013.01)

(58) Field of Classification Search
CPC .............. H04N 1/4095; H04N 1/00005; H04N 1/00209; H04N 1/4072; H04N 1/00795; H04N 2201/0091; H04N 1/00018
See application file for complete search history.

(56) References Cited

U.S. PATENT DOCUMENTS

| 8,164,809 | B2* | 4/2012 | Ohkawa | H04N 1/4095 358/1.9 |
| 9,025,170 | B2* | 5/2015 | Nakamura | H04N 1/00082 358/1.13 |
| 2002/0071131 | A1* | 6/2002 | Nishida | H04N 1/4095 358/1.9 |
| 2007/0201105 | A1* | 8/2007 | Shoda | H04N 1/4095 358/449 |

(Continued)

FOREIGN PATENT DOCUMENTS

| CN | 104917930 A | 9/2015 |
| CN | 108513039 A | 9/2018 |

(Continued)

*Primary Examiner* — Ted W Barnes
(74) *Attorney, Agent, or Firm* — Canon U.S.A., Inc. IP Division

(57) ABSTRACT

Show-through is suitably removed while an image, such as a tag or highlighter, on a first surface is prevented from being removed. A luminance value of a pixel of a target region is increased based on a first correction amount in a case where the pixel is not a pixel of a halftone dot region and a value specified based on a saturation of the pixel of the target region is less than a predetermined value, or a luminance value of the pixel is increased based on a second correction amount less than the first correction amount in a case where the pixel is not a pixel of the halftone dot region and the value specified based on the saturation of the pixel of the target region is greater than or equal to the predetermined value.

12 Claims, 16 Drawing Sheets

(56) References Cited

U.S. PATENT DOCUMENTS

| | | | | |
|---|---|---|---|---|
| 2009/0190181 A1* | 7/2009 | Ohkawa | ............... | H04N 1/4095 |
| | | | | 358/3.23 |
| 2011/0261404 A1* | 10/2011 | Umezawa | ............ | H04N 1/4095 |
| | | | | 358/1.15 |
| 2011/0304865 A1* | 12/2011 | Ariga | .................. | H04N 1/4095 |
| | | | | 358/1.9 |
| 2013/0301067 A1* | 11/2013 | Nakamura | ........... | H04N 1/4095 |
| | | | | 358/1.13 |
| 2015/0215489 A1* | 7/2015 | Kamisoyama | ....... | H04N 1/4095 |
| | | | | 358/475 |
| 2015/0256715 A1* | 9/2015 | Ikari | .................. | H04N 1/40093 |
| | | | | 358/3.24 |
| 2015/0373227 A1* | 12/2015 | Ikari | .................. | G06K 15/1869 |
| | | | | 358/2.1 |
| 2016/0014302 A1* | 1/2016 | Oosaki | ................ | H04N 1/4095 |
| | | | | 358/509 |
| 2016/0286089 A1* | 9/2016 | Mori | .................... | H04N 1/4095 |
| 2017/0201648 A1* | 7/2017 | Sugahara | ............... | H04N 1/405 |
| 2018/0249044 A1* | 8/2018 | Ikari | .................... | H04N 1/4095 |
| 2019/0394357 A1* | 12/2019 | Sugahara | ................ | H04N 1/62 |

FOREIGN PATENT DOCUMENTS

| | | | | |
|---|---|---|---|---|
| EP | 3367656 A1 | * | 8/2018 | ......... G03G 15/5025 |
| JP | 2009124332 A | * | 6/2009 | |
| JP | 2009124332 A | | 6/2009 | |
| JP | 2015171099 A | | 9/2015 | |

* cited by examiner

FIG.9

| VARIANCE VALUE | 0 | 1 | 2 | 3 | ... | 127 | 128 |
|---|---|---|---|---|---|---|---|
| MEAN VALUE | 255 | 240 | 230 | 225 | ... | 105 | 100 |

FIG.13A

| VARIANCE VALUE | |
|---|---|
| HIGH | LOW |
| PERFORM CORRECTION BASED ON LUT (THERE IS POSSIBILITY THAT HALFTONE DOT AND SHOW-THROUGH OVERLAP) | PERFORM CORRECTION BASED ON LUT (THERE IS POSSIBILITY OF SHOW-THROUGH ON SHEET-WHITE) |

FIG.13B

| | | VARIANCE VALUE | |
|---|---|---|---|
| | | HIGH | LOW |
| SATURATION | HIGH | PERFORM CORRECTION BASED ON LUT (THERE IS POSSIBILITY THAT COLOR HALFTONE DOT AND SHOW-THROUGH OVERLAP) | PERFORM CORRECTION WEAKLY BASED ON LUT (THERE IS POSSIBILITY OF TAG OR HIGHLIGHTER) |
| | LOW | PERFORM CORRECTION BASED ON LUT (THERE IS POSSIBILITY THAT GRAY HALFTONE DOT AND SHOW-THROUGH OVERLAP) | PERFORM CORRECTION BASED ON LUT (THERE IS POSSIBILITY OF SHOW-THROUGH ON SHEET-WHITE) |

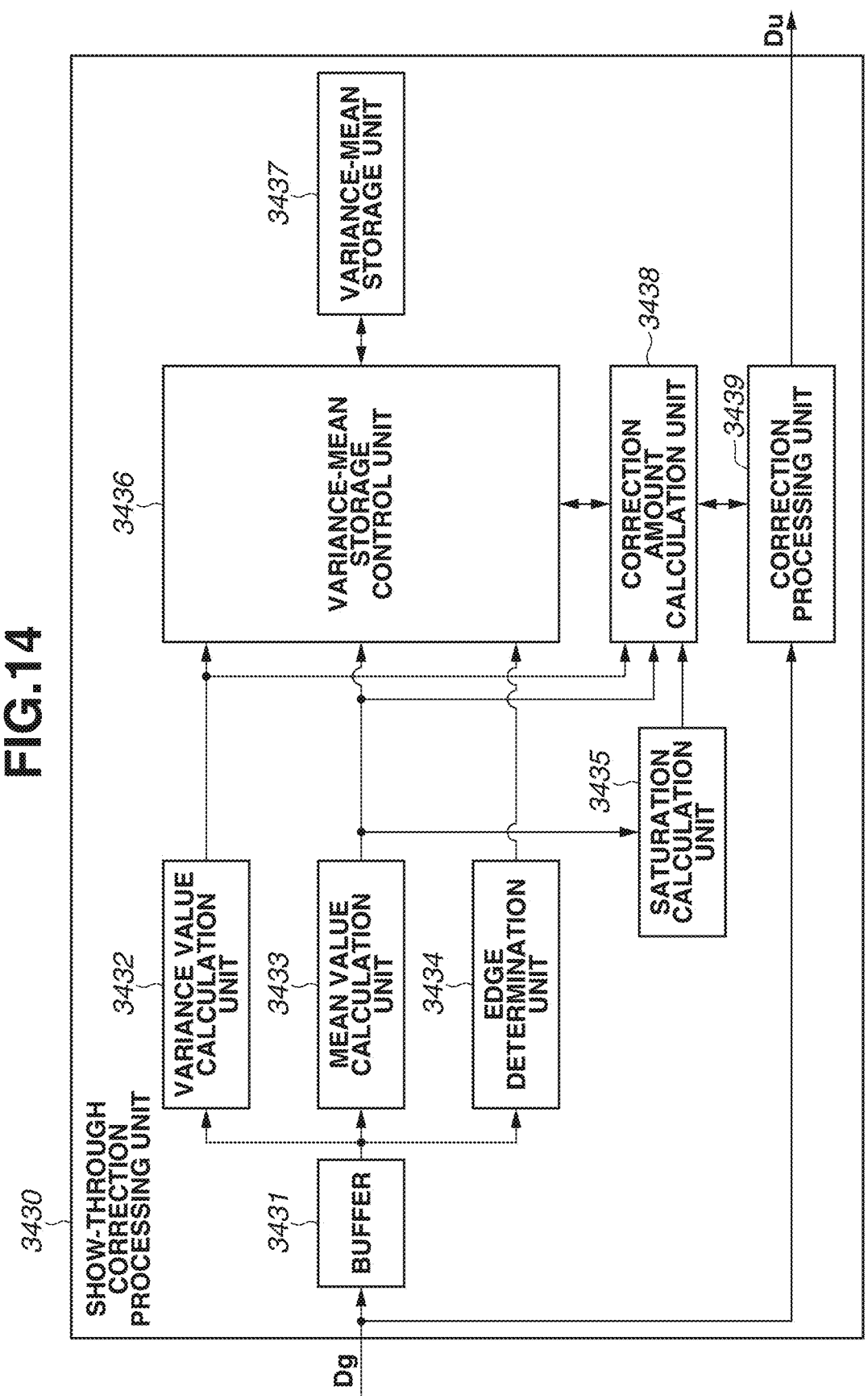

IMAGE PROCESSING APPARATUS, METHOD OF CONTROLLING IMAGE PROCESSING APPARATUS, AND STORAGE MEDIUM

BACKGROUND

Field of the Disclosure

The present disclosure relates to an image processing apparatus, a method of controlling the image processing apparatus, and a storage medium,

Description of the Related Art

When a document is read by an image processing apparatus, such as a scanner or multi-function peripheral, "show-through" sometimes occurs. The "show-through" is a condition in which, when the first surface of a document is read, an image on a second surface opposite to the first surface of the document becomes visible and read. The "show-through" often occurs at high-density portions of the second surface and is caused resulting from the amount of light of a light source in reading and the thickness of a read document (how much light is transmitted the document). An occurrence of "show-through" leads to poor visual quality of image data generated by reading a document.

Japanese Patent Application Laid-Open No. 2015-171099 discusses a technique for reducing "show-through", In Japanese Patent Application Laid-Open No. 2015-171099, whether a pixel included in an input image acquired by reading a document is a pixel of a halftone dot region is determined, and in a case where the pixel is determined. as a pixel not included in the halftone dot region, the color of the pixel is changed to white.

Meanwhile, in a case where pixels determined as pixels not included in the halftone dot region are uniformly corrected, an image on a first surface that is difficult to be determined as a halftone dot region, such as a tag or highlighter, may erroneously be corrected and lost.

SUMMARY

To solve the above-described issue, an image processing apparatus according to an aspect of the present disclosure includes a first determination unit configured to determine whether a pixel of a target region in an input image acquired by reading a document is a pixel of a halftone dot region, a specifying unit configured to specify a value based on a saturation of a pixel of the target region, a second determination unit configured to determine whether the value specified by the specifying unit is less than a predetermined value, and a correction unit configured to increase a luminance value of the pixel of the target region based on a first correction amount in a case where the first determination unit determines that the pixel of the target region is not a pixel of the halftone dot region and the second determination unit determines that the value specified by the specifying unit is less than the predetermined value, or to increase the luminance value of the pixel of the target region based on a second correction amount less than the first correction amount in a case where the first determination unit determines that the pixel of the target region is not a pixel of the halftone dot region and the second determination unit determines that the value specified by the specifying unit is greater than or equal to the predetermined value.

Further features of the present disclosure will become apparent from the following description of exemplary embodiments with reference to the attached drawings.

BRIEF DESCRIPTION OF THE DRAWINGS

FIG. 9 is a table showing an example of stored content of a variance-mean storage unit (lookup table (LUT)) according to one or more aspects of the present disclosure.

FIGS. 13A and 13B are tables illustrating correction execution states.

FIG. 14 is a block diagram illustrating a configuration example of a show-through correction processing unit according to one or more aspects of the present disclosure.

DESCRIPTION OF THE EMBODIMENTS

Various exemplary embodiments of the present disclosure will be described below with reference to the drawings.

First Exemplary Embodiment

<External View of Copying Machine>

Figure 1:
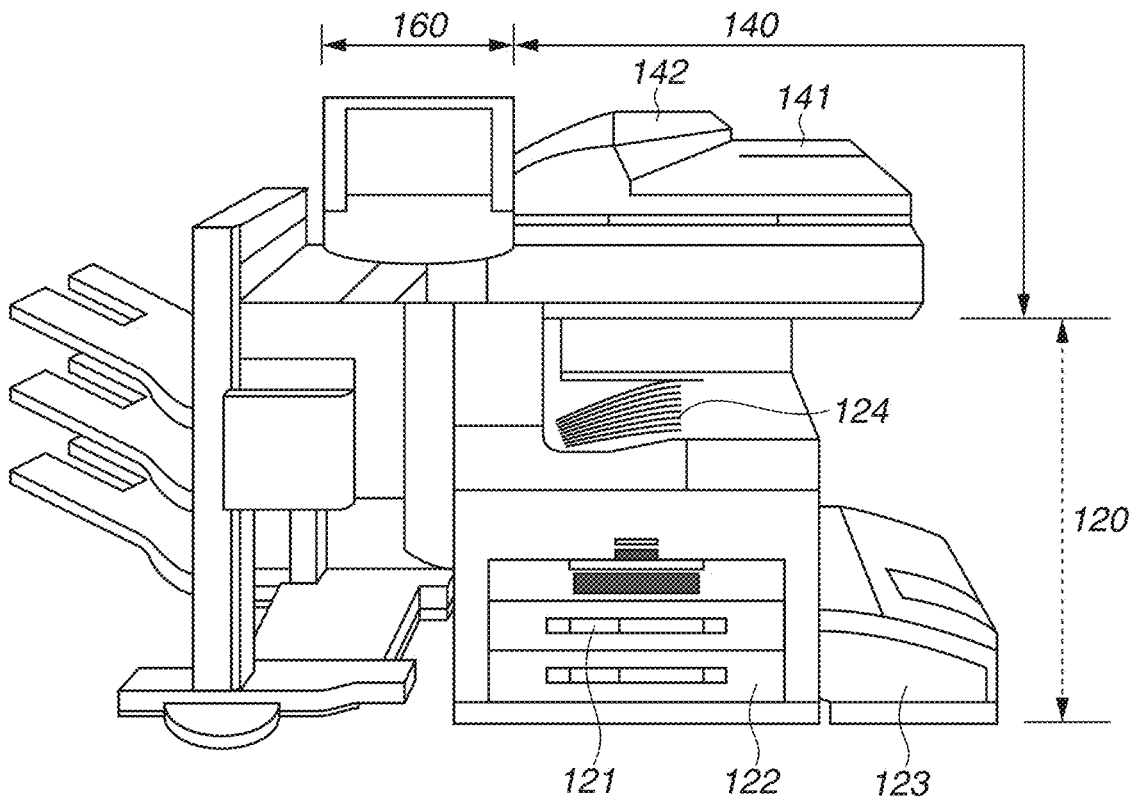
FIG. 1 is a diagram illustrating an example of an external view of a copying machine according to one or more aspects of the present disclosure.

FIG. 1 is a diagram illustrating an example of an external view of a copying machine as an example of an image processing apparatus according to a first exemplary embodiment of the present disclosure.

A scanner 140 is an image reading unit (a reading unit) and converts information on an image on a document into an electric signal by inputting reflection light acquired by exposing and scanning the image with light emitted from an illumination lamp to a linear image sensor (charge-coupled device (CCD) sensor). The scanner 140 further converts the electric signal into a luminance signal of red (R), green (G), and blue (B) and outputs the luminance signal as image data to a controller (details thereof will be described below with reference to FIG. 3).

The document is set on a tray 142 of a document feeder 141. In response to a user's instruction input via. an operation unit 160 to start reading, the controller transmits a document reading instruction to the scanner 140. In response to the document reading instruction, the scanner 140 feeds documents one by one from the tray 142 of the document feeder 141 and reads each fed document. The documents can also be placed on a platen glass, which will be described below, and read.

A printer 120 (a printing unit) is an image forming device that forms image data received from the controller on a sheet.

An image forming method in the present exemplary embodiment is an electrophotographic method using a photosensitive drum, a development device, and a fixing device. In the electrophotographic method, toner applied to the drum is transferred onto a sheet and fixed. The printer 120 includes a plurality of sheet cassettes (sheet storage units) 121, 122, and 123 for sheets of different sizes or orientations. Printed sheets are discharged onto a sheet discharge tray 124.

The copying machine performs a copy job that includes reading a document image by the scanner 140, generating image data, and printing the image on a sheet using the printer 120.

The copying machine also performs a transmission job that includes reading a document image by the scanner 140, generating image data, and transmitting the generated image data via a network, such as a local area network (LAN).

<Copying Machine—Scanner>

Figure 2:
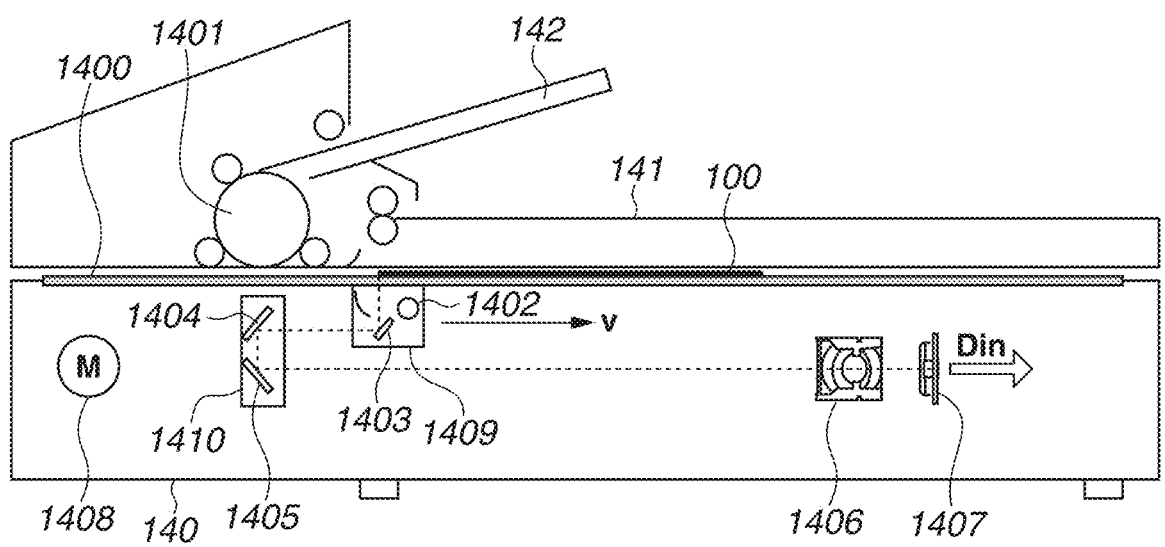
FIG. 2 is a diagram illustrating a configuration example of a scanner according to one or more aspects of the present disclosure.

FIG. 2 is a schematic view illustrating a main configuration and a reading operation of the scanner 140 using the linear image sensor according to the present exemplary embodiment. In FIG. 2, a document 100 to be read is placed on a platen glass 1400. The document 100 is illuminated by the illumination lamp 1402, and the reflection light travels via mirrors 1403, 1404, and 1405 and forms an image on a CCD sensor 1407 by a lens 1406. A first mirror unit 1409 including the mirror 1403 and the illumination lamp 1402 moves at a velocity v, and a second mirror unit 1410 including the mirrors 1404 and 1405 moves at a velocity 1/2 v, and therefore a front surface of the document 100 is scanned. The first mirror unit 1409 and the second mirror unit 1410 are driven by a motor 1408. The reflection light input to the CCD sensor 1407 is converted into an electric signal by the CCD sensor 1407, and an electric signal of each pixel is converted into digital data by an analog/digital (A/D) converter (not illustrated). The digital data is input as a pixel signal Din to the controller.

The scanner 140 also reads a document in the automatic document feed mode by operating the document feeder 141. First, the document 100 in FIG. 2 is placed on the tray 142. Then, the document 100 is conveyed by a driving roller 1401 from the tray 142 to the document feeder 141 via a surface of the platen glass 1400 (under the driving roller 1401). In this feed mode, an optical system such as the first mirror unit 1409 and the second mirror unit 1410 is fixed and is not moved. Especially the first mirror unit 1409 is fixed at a position below the driving roller 1401 and reads a document conveyed to a position below the driving roller 1401 by the driving roller 1401. In this feed mode, a document is simply moved in a predetermined direction, and therefore a large number of documents can be read continuously at high speed.

The document 100 may have a printed image, such as a picture, graph, or character, not only on a front surface (the surface to be illuminated with light by the illumination lamp 1402) that is to be read but also on a surface (back surface) that is not to be read. In such a case, the image on the surface (back surface) opposite to the front surface may affect image data to be read on the front surface, i.e., "show-through" may occur.

The show-through can occur in any of the above-described reading modes. The degree of show-through differs depending on the thickness of a medium, such as the sheet of the document 100 (light transmittance), and the amount of light emitted by the illumination lamp 1402. In general, the degree of show-through increases with decrease in thickness of the document and with increase in the amount of emitted light. The density of an image printed on a back surface also contributes to "show-through", and "show-through" is more likely to occur with a printed image having a higher density.

<Copying Machine—Controller>

Figure 3:
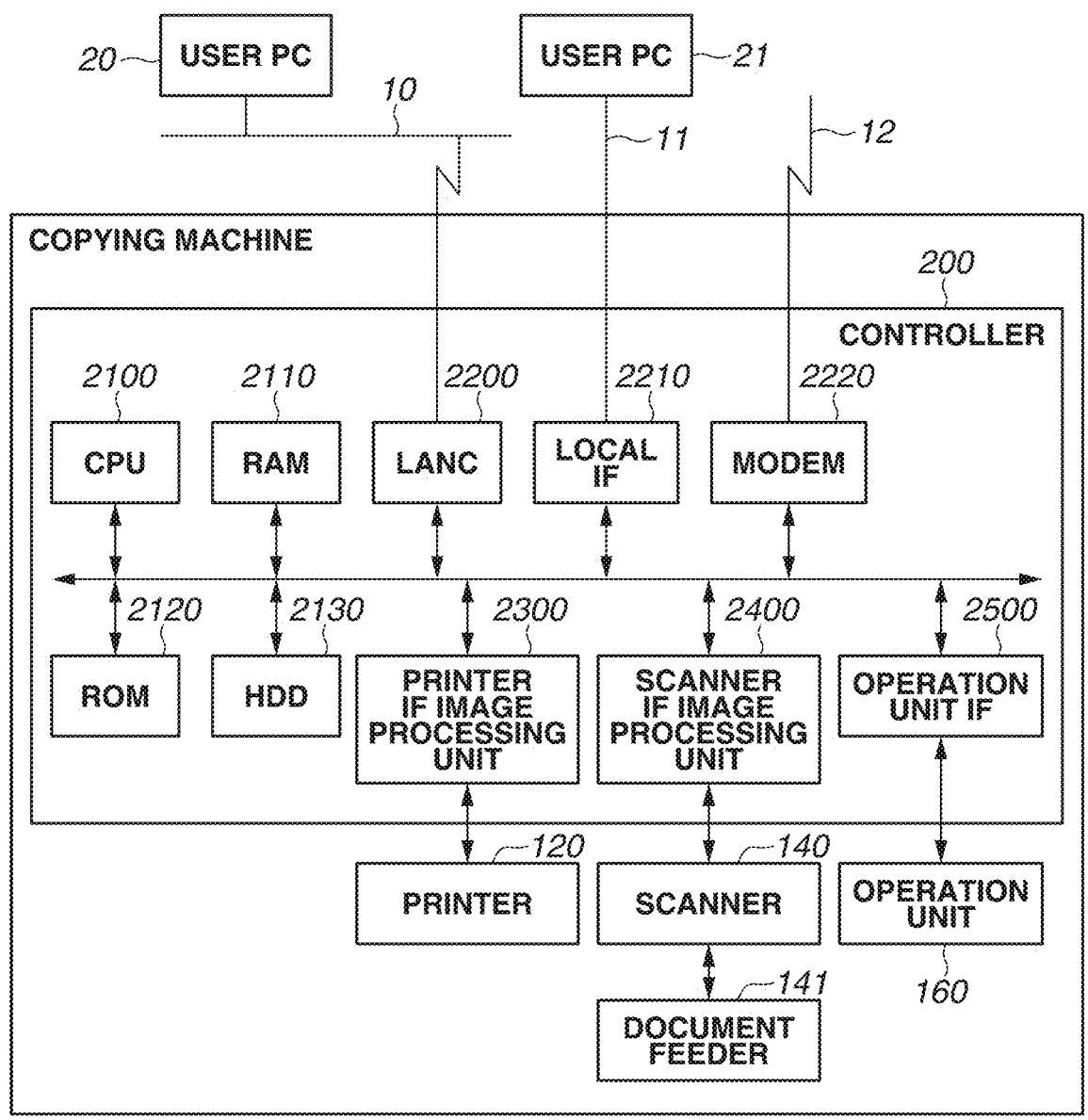
FIG. 3 is a block diagram illustrating a configuration example of a controller according to one or more aspects of the present disclosure.

FIG. 3 is a block diagram illustrating an example of a hardware configuration of the copying machine according to the present exemplary embodiment, especially an example of a configuration of the controller in detail.

A controller 200 is similar to the controller described above. The controller 200 is connected to the scanner 140, which is an image input device, the printer 120, which is an image output device, a LAN 10, and a public line (WAN) 12. The controller 200 comprehensively controls operations of the copying machine and controls input and output of image information and device information.

A central processing unit (CPU) 2100 is a processor that controls the entire copying machine. The CPU 2100 reads a control program stored on a read-only memory (ROM) 2120 onto a random-access memory (RAM) 2110 and executes the control program, to comprehensively control access to various devices from the copying machine. Furthermore, the CPU 2100 comprehensively controls various types of image processing in the controller 200. The RAM 2110 is a system work memory and is also an image memory that temporarily stores image data. The ROM 2120 is a boot ROM and stores a system boot program. A hard disk drive (HDD) 2130 mainly stores information (system software) and image data for computer activation and operations. The data can be stored on not the HDD 2130 but another recording medium that retains data even when a power supply is disconnected.

A LAN controller (LANC) 2200 (a transmitting unit) is connected to the LAN 10, and image data for output and information for device control are input and output between the LANC 2200 and a user personal computer (user PC) 20. A local interface (local IF) 2210 is an interface, such as a universal serial bus (USB) or Centronics interface, and is connected to a user PC 21 and the printer 120 via a cable 11 and inputs and outputs data. A modem 2220 is connected to the public line 12 and inputs and outputs data. A printer interface (printer IF) image processing unit 2300 is connected to the printer 120 and communicates with a CPU of the printer 120. Further, the printer IF image processing unit 2300 performs synchronous/asynchronous conversion of image data and performs image processing for print output based on instructions from the CPU 2100. A scanner interface (scanner IF) image processing unit 2400 is connected to the scanner 140 connected to the document feeder 141 and communicates with a CPU of the scanner 140. Further, the scanner IF image processing unit 2400 performs synchronous/asynchronous conversion of image data and image processing, such as show-through correction processing described below. An operation unit interface (operation unit IF) 2500 is an interface that outputs image data to be displayed on the operation unit 160 from the controller 200 to the operation unit 160 and outputs information input by the user of the copying machine via the operation unit 160 to the controller 200.

<Scanner IF Image Processing Unit>

Figure 4:
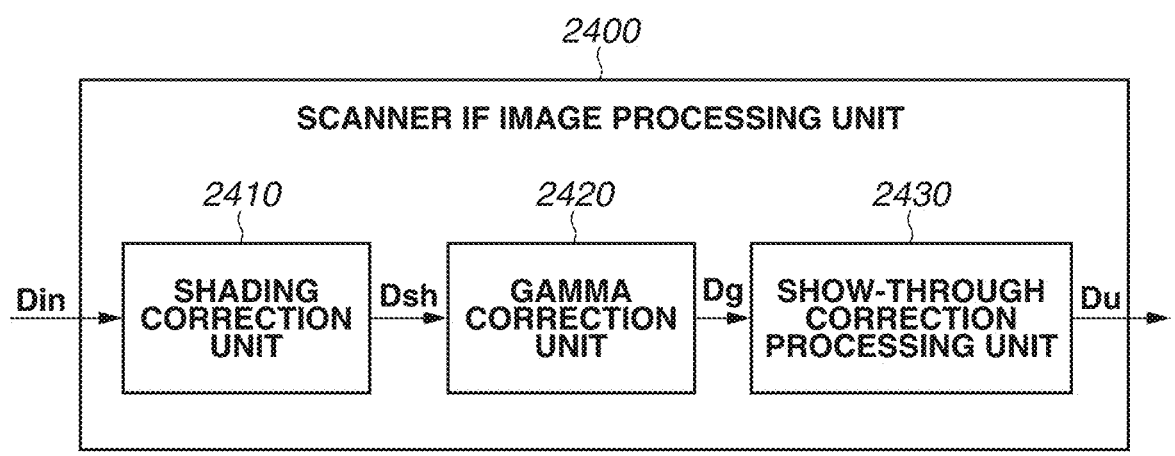
FIG. 4 is a block diagram illustrating a configuration example of a scanner interface (scanner IF) image processing unit according to one or more aspects of the present disclosure.

FIG. 4 is a block diagram illustrating a configuration of the scanner IF image processing unit 2400 according to the present exemplary embodiment.

A shading correction unit 2410 receives the pixel signal Din (refer to FIG. 2) as input. The pixel signal Din is a signal that is output from the scanner 140 and indicates a luminance. The shading correction unit 2410 corrects luminance unevenness originating from characteristics of the optical system and an image capturing system using a publicly-known technique, to obtain an image having uniform brightness. A pixel signal Dsh as a result of shading correction processing is output to a subsequent unit.

A gamma correction unit 2420 corrects color characteristic differences between reading elements and devices using a publicly-known technique. A pixel signal Dg as a result of gamma correction processing is output to a subsequent unit.

A show-through correction processing unit 2430 performs processing to reduce show-through that occurs at reading image data on a front surface of a document read by the scanner 140. The show-through correction processing unit 2430 generates show-through correction information as an index for show-through correction and performs show-through correction processing using the correction information.

A pixel signal Du as a result of show-through correction processing is output from the scanner IF image processing unit 2400, written to the RAM 2110 by a memory controller (not illustrated), and temporarily stored on the RAM 2110.

<Show-Through Correction Processing Unit>

Figure 5:
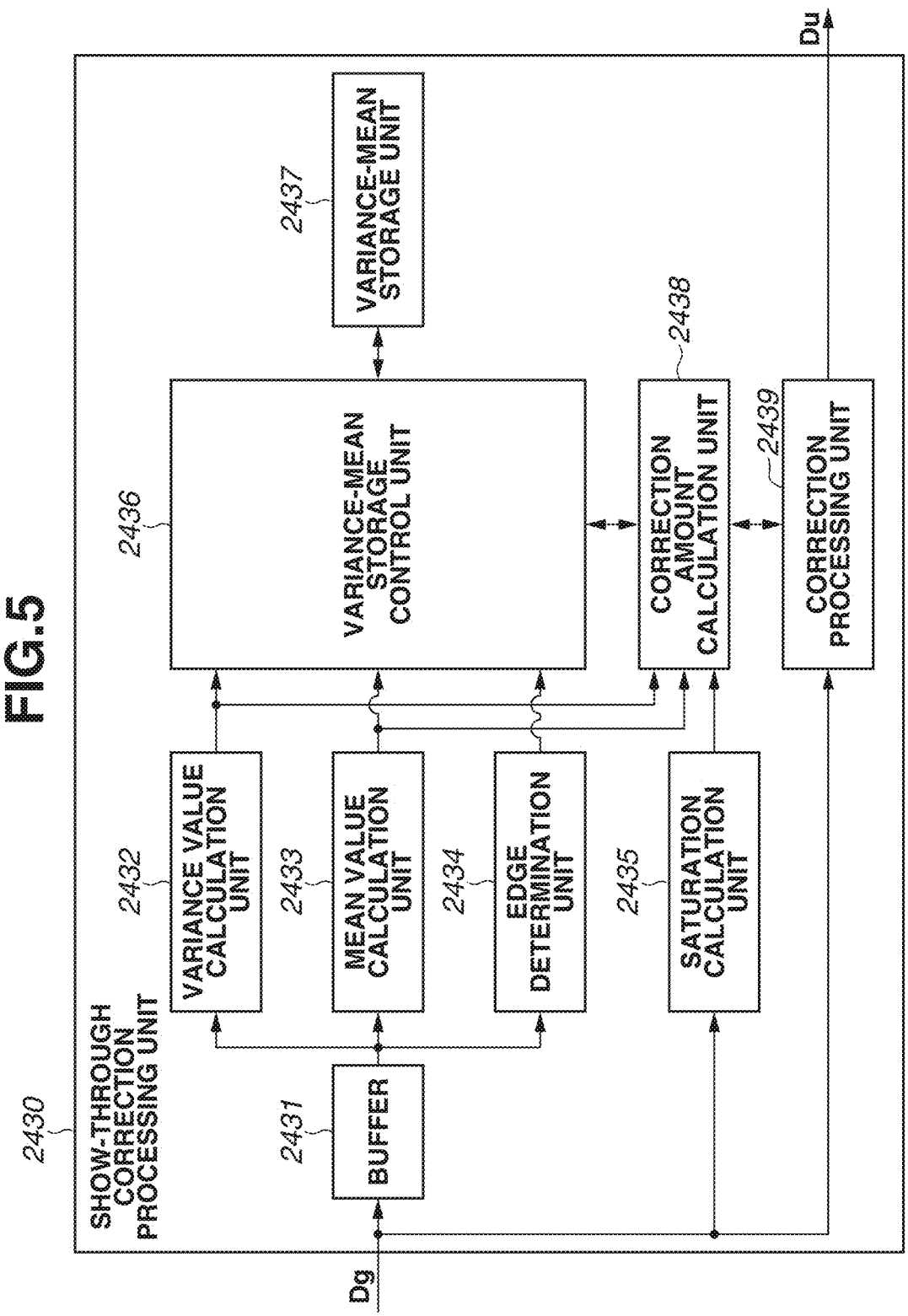
FIG. 5 is a block diagram illustrating a configuration example of a show-through correction processing unit according to one or more aspects of the present disclosure.

FIG. 5 is a block diagram illustrating a configuration of the show-through correction processing unit 2430 illustrated in FIG. 4.

A buffer 2431 temporarily stores the pixel signal Dg input to the show-through correction processing unit 2430. A variance value calculation unit 2432, a mean value calculation unit 2433, and an edge determination unit 2434, which are subsequent units, need to refer to a window with a focused pixel being a center of the window, and the buffer 2431 is a buffer for forming the window. For example, in a case where reference to a 5×5 window is to be performed in subsequent processing, the buffer size is five lines. In a case where reference to a 7×7 window is to be performed in subsequent processing, the buffer size is seven lines.

Next, the variance value calculation unit 2432 receives pixel signals of the window size for calculation together from the buffer 2431 and calculates variance values. The variance values indicate the dispersion of signal values of the pixels in the window size. The variance values are calculated by the following Formula (1).

$$\text{Variance Value}(\sigma^2) = \frac{1}{N}\sum_{k=1}^{N}(x_k - x_a)^2, \quad \text{Formula (1)}$$

where N is the number of pixels in the window size, Xk is the signal value of the kth pixel in the window size, and Xa is the mean value of the signal values of the pixels in the window size.

Since the variance values are likely to be great values, standard deviations (σ) can be used instead.

Next, the mean value calculation unit 2433 receives pixel signals of the window size for calculation together from the buffer 2431 and calculates a mean value. The mean value is calculated by the following Formula (2).

$$\text{Mean Value}(x_a) = \frac{1}{N}\sum_{k=1}^{N}(x_k) \quad \text{Formula (2)}$$

The definitions of the symbols are the same as those in Formula (1). The window size for the mean value calculation and the window size for the variance value calculation are the same.

Next, the edge determination unit 2434 receives pixel signals of the window size for calculation together from the buffer 2431 and determines whether the focused pixel is an edge region. The edge determination is performed using a publicly-known technique. Specifically, whether the focused pixel is an edge region is determined by applying a Prewitt filter or Sobel filter to the window with the focused pixel being the center of the window and determining the calculation result based on a threshold value.

Next, a saturation calculation unit 2435 calculates a saturation value S of the focused pixel. The saturation value S indicates brilliance of a color and is calculated from the pixel signal Dg. In the present exemplary embodiment, the saturation value S of a pixel is calculated simply by subtracting the minimum value of R, G, and B values that are color component values of the pixel signal Dg from the maximum value of the R, G, and B values. Formula (3) is specified below.

$$\text{Saturation }(S) = \max(R, G, B) - \min(R, G, B) \quad \text{Formula (3)},$$

where max(R, G, B) is the value of R-, G-, and B-components of the pixel signal Dg that has the highest luminance, and min(R, G, B) is the value of the R-, G-, and B-components of the pixel signal Dg that has the lowest luminance.

Specifically, the saturation value S is high in a case where the R-, G-, and B-components have a great difference, and the pixel signal Dg can be said to be a brilliant high-saturation pixel. Since show-through is read by an image reading apparatus through a sheet surface of a document, the saturation is less likely to increase due to an effect of sheet fibers and the like.

Next, a variance-mean storage control unit 2436 controls writing and reading of data to and from a variance-mean storage unit 2437. The variance-mean storage unit 2437 stores a mean value for each variance value in the form of a look up table (LUT). For example, each variance value is an address in the LUT, and the mean value in correspondence with the variance value is stored as data in the address. First, the variance-mean storage control unit 2436 refers to an edge determination result output from the edge determination unit 2434 and checks whether the focused pixel is in an edge region. In a case where the focused pixel is in an edge region, data writing to the variance-mean storage unit 2437 is not performed. Next, in a case where the focused pixel is not in an edge region, the variance-mean storage control unit 2436 refers to the variance value output from the variance value calculation unit 2432 and reads the mean value that is stored in the same variance value in the variance-mean storage unit 2437. Specifically, the variance-mean storage control unit 2436 accesses the address of the same value as the variance value to which the variance-mean storage control unit 2436 refers in the LUT, and reads the data (mean value). Next, the variance-mean storage control unit 2436 compares the read mean value and the mean value output from the mean value calculation unit 2433. Then, in a case where the mean value output from the mean value calculation unit 2433 is greater, the variance-mean storage control unit 2436 writes the greater mean value to the variance-mean storage unit 2437. Specifically, the read data in the address in the LUT is updated with the greater value. The variance-mean storage control unit 2436 then outputs the mean value read from the variance-mean storage unit 2437 to a correction amount calculation unit 2438.

The mean value read from the variance-mean storage unit 2437 refers to the brightest mean value in an image region processed before the currently-processed focused pixel in an input image. The brightest mean value is show-through correction information (index for show-through correction) the present exemplary embodiment.

Figure 7:
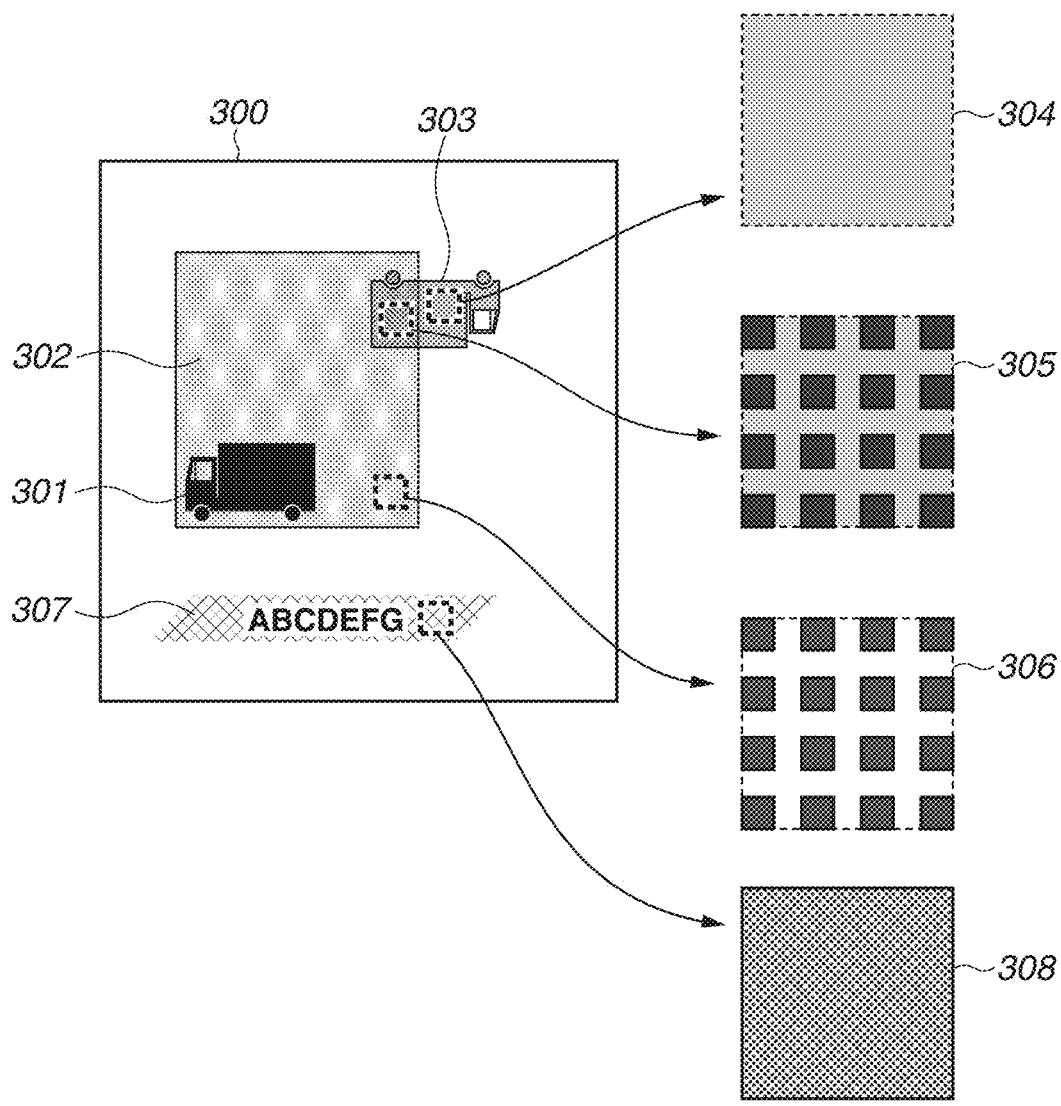
FIG. 7 is a diagram illustrating read image data as an example according to one or more aspects of the present disclosure.

Detailed meanings of the data (show-through correction information) stored in the variance-mean storage unit 2437 will be described below with reference to FIG. 7. FIG. 7 is a diagram illustrating an example of read image data 300 on the front surface of the document 100 read by the scanner 140. A high-density image 301, a halftone image 302 expressed by halftone dots, and a highlighter image 307 as printed images are on the front surface of the document 100. Further, a printed image similar to the high-density image 301 is on the back surface of the document 100. In this case, a high-density image on the back surface of the document 100 appears as a show-through image 303 on the read image data 300 on the front surface of the document 100 that is read by the scanner 140.

Each region of the read image data 300 will be focused. First, a region focused on the halftone image 302 is illustrated as a halftone focused region 306. The halftone focused region 306 has a halftone dot structure, and accordingly each pixel is either in a region with halftone dots or in a region without halftone dots. The region is divided by a predetermined window size, and a variance value and a mean value are calculated to obtain a variance value X2 and a mean value Y2. Next, a region focused on the show-through image 303 is illustrated as a show-through focused region 304. In the show-through focused region 304, the region is divided by a predetermined window size, and a variance value and a mean value are calculated to obtain a variance value X1 and a mean value Y3. The variance value X1 obtained from the show-through focused region 304 is a small value for the following reason. Specifically, show-through components are image components acquired through the sheet, and only low-frequency components of the image on the back surface are likely to appear. Thus, even in a case where the image on the back surface is drawn by halftone dots, show-through components often occur without luminance unevenness as in the show-through focused region 304, and therefore the variance value is a small value. Further, a sheet-white region with no prints and no show-through on the read image data 300 is divided by a predetermined window size, and a variance value and a mean value are calculated as the variance value X1 and a mean value Y4. As described above, show-through components are less likely to affect variance values, so that the variance value of the sheet-white region and the variance value obtained from the region of the show-through image 303 are likely to be close values. In the present exemplary embodiment, the variance values are the variance value X1. Next, a region focused on the region where the halftone image 302 and the show-through image 303 overlap is illustrated as an overlap focused region 305. The overlap focused region 305 has a halftone dot structure, and accordingly each pixel is in either a region with halftone dots or a region without halftone dots. The pixel values overall are dark (low values) due to an effect of the show-through image 303. In the overlap focused region 305, the region is divided by a predetermined window size, and a variance value and a mean value are calculated to obtain the variance value X2 and a mean value Y1. As described above, show-through components are less likely to affect variance values, and therefore the variance value of the overlap focused region 305 and the variance value of the halftone focused region 306 of the halftone image 302 with no show-through are likely to be close values. In the present exemplary embodiment, the variance values are the variance value X2.

Figure 8:
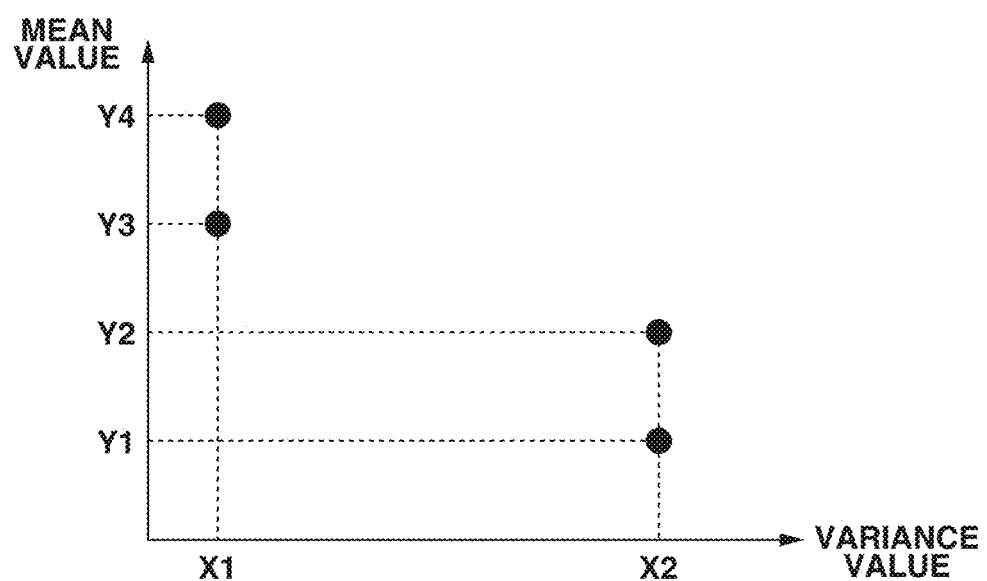
FIG. 8 is a diagram illustrating a relationship between variance values and mean values of luminance values of read image data according to one or more aspects of the present disclosure.

Next, the index (show-through correction information) for show-through correction will be described below with reference to the variance values X1 and X2 and the mean values Y1 to Y4. FIG. 8 is a graph showing the variance values X1 and X2 and the mean values Y1 to Y4. In FIG. 8, the coordinates (X1, Y4) represent the sheet-white region, the coordinates (X1, Y3) represent the show-through focused region 304, the coordinates (X2, Y2) represent the halftone focused region 306, and the coordinates (X2, Y1) represent the overlap focused region 305. In other words, the sheet-white region is the coordinates (X1, Y4), and the sheet-white region with show-through is the coordinates (X1, Y3). Further, the halftone focused region 306 is the coordinates (X2, Y2), and the halftone focused region 306 with show-through is the coordinates (X2, Y1). Therefore, in a case where the focused pixel is corrected using the difference between Y3 and Y4 in the show-through focused region 304, the signal values of the show-through focused region 304 are corrected into the signal values of the sheet-white region, and show-through correction is performed as appropriate. Further, in the overlap focused region 305, in a case where the focused pixel is corrected using the difference between Y1 and Y2, the signal values of the overlap focused region 305 are corrected into the signal values of the halftone focused region 306, and show-through correction is performed as appropriate. In other words, the mean value of the region without show-through is used as the index (i.e., show-through correction information) for show-through correction for each variance value.

The variance value is based on the amount of halftone dots in the focused region. Further, the amount of halftone dots is uniquely determined based on a density to be printed. Thus, the mean value of the region without show-through for each variance value is stored, whereby even in a case where the show-through region or the region where show-through and the halftone dots on the front surface overlap occurs, the show-through is corrected as appropriate by correcting the signal values using the stored mean value as the index. The phrase "the mean value for each variance value is stored" refers to "the mean value for each amount of halftone dots is stored".

To acquire an appropriate index, the mean value of the region without show-through is acquired. In order to acquire the mean value of the region without show-through with ease, the highest mean value for each variance value in input image data is used as the index in the present exemplary embodiment as described above in the description of the variance-mean storage control unit 2436. This method uses the characteristic that the mean value can be higher (brighter) in the region without show-through than in the region with show-through. It is rare for an entire halftone dot region in input image data to be included in a show-through region, and in many cases, there are halftone dot regions without show-through, so that the method is sufficiently usable.

Further, even in a case where the brightest mean value in an image region processed before the currently-processed focused pixel in an input image is used as show-through correction information as in the present exemplary embodiment, appropriate show-through correction information is stored. This is because it is rare for show-through regions to solely continue on a document, and the present exemplary embodiment is sufficiently usable.

Characteristics of show-through in the image data 300 in FIG. 7 will be described below with a focus on the saturation.

The show-through image 303 is data similar to the high-density image 301, and the only difference is that the print is on the front surface or on the back surface. In this case, even in a case where the high-density image 301 is a high-saturation image, the show-through focused region 304 of the show-through image 303 is a low-saturation image because it is read through the sheet surface by the scanner 140. This is due to the characteristic that the saturation of show-through is less likely to increase due to an effect of sheet fibers, as it is read through the sheet surface. However, in a case where the halftone image 302 on the front surface is a high-saturation image, the overlap focused region 305 where the image on the front surface and the low-saturation show-through overlap consequently becomes a high-saturation image.

On the other hand, the highlighter image 307 of the image data 300 is a region where printed alphabetic letters are marked with a highlighter. A region focused on the highlighter image 307 is illustrated as a highlighter focused region 308. In general, since fluorescent colors have high saturation, the highlighter focused region 308 is a high-saturation highlighted region. Further, the highlighter image 307 does not have a halftone dot structure and thus has a low variance value. In the present exemplary embodiment, the characteristics difference in saturation between the fluorescent colors and the show-through is used to suitably perform show-through correction processing. Details thereof will be described below.

Figure 6:
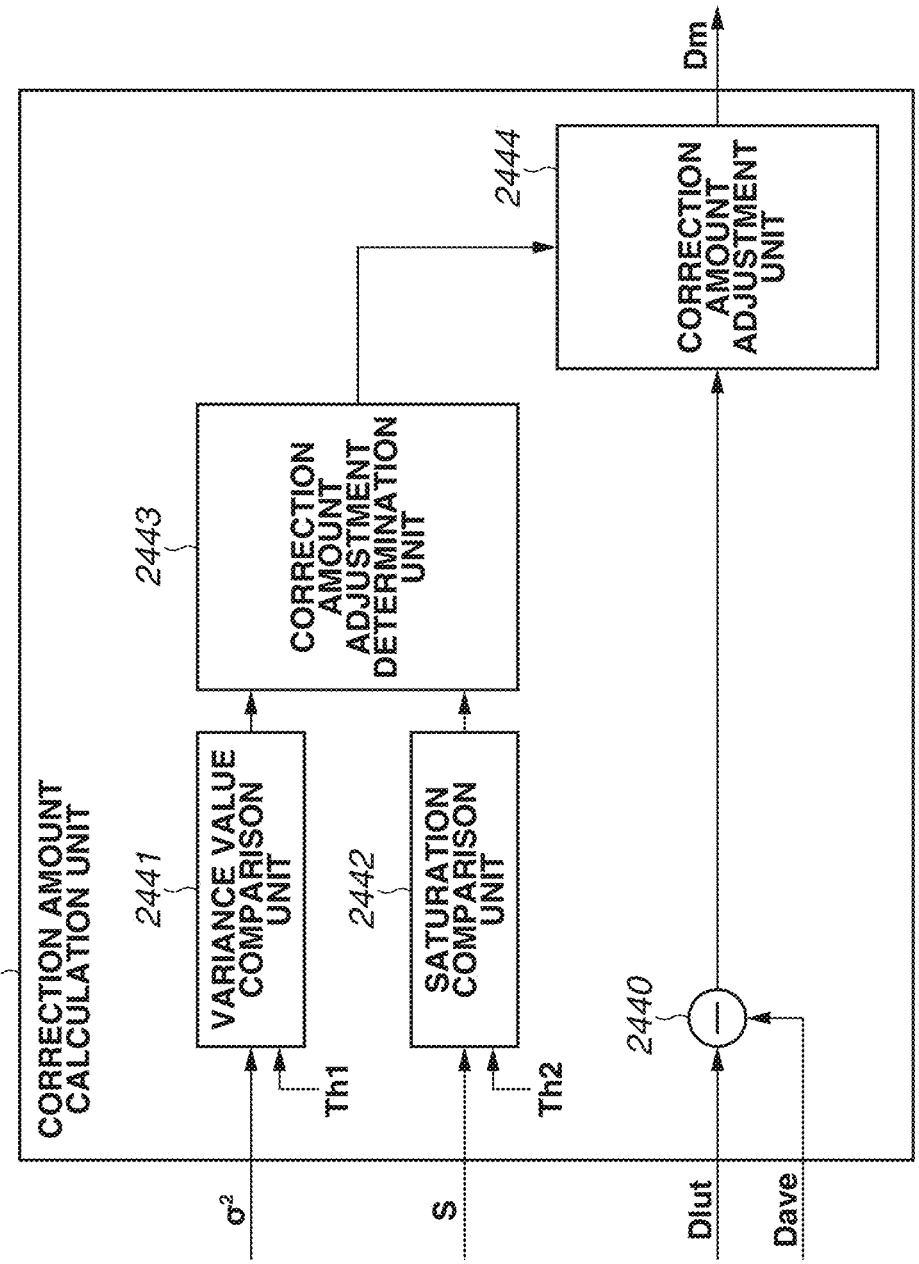
FIG. 6 is a diagram illustrating a configuration example of a correction amount calculation unit according to one or more aspects of the present disclosure.

Next, the correction amount calculation unit 2438 in FIG. 5 calculates a correction amount for the correction of the pixel signal Dg. FIG. 6 illustrates details of the internal configuration of the correction amount calculation unit 2438. First, a pixel signal Dave is the mean value of the current focused region that is calculated by the mean value calculation unit 2133. Further, a pixel signal Dlut is the mean value that is received from the variance-mean storage control unit 2436. As described above, the mean value that is received from the variance-mean storage control unit 2436 is a variance value close to the variance value of the focused position and indicates the brightest mean value of the previously-processed pixels. Further, a signal $\sigma^2$ is the variance value that is received from the variance value calculation unit 2432, and a signal S is the saturation value that is received from the saturation calculation unit 2435.

First, a subtracter 2440 subtracts the current input pixel signal Dave from the pixel signal Dlut that is received from the variance-mean storage control unit 2436 to calculate the difference. In a case where the difference is a negative value, it is determined that the mean value of the focused region is brighter than the mean value that is stored in the variance-mean storage control unit 2436, and therefore an output value of the subtracter 2440 is zero. The calculated difference refers to, for example, the difference between Y2 and Y1 in FIG. 8 and, in other words, refers to a show-through correction amount. The calculated luminance value difference is output to a correction amount adjustment unit 2444.

Next, the variance value $\sigma^2$ that is received from the variance value calculation unit 2432 is input to a variance value comparison unit 2441, and the variance value comparison unit 2441 compares the input variance value $\sigma^2$ and a variance value threshold value Th1 (threshold value for the dispersion). In a case where the input variance value $\sigma^2$ is less than or equal to the variance value threshold value Th1, it is determined that the focused region is a low variance value region, whereas in a case where the input variance value $\sigma^2$ is greater than the variance value threshold value Th1, it is determined that the focused region is a high variance value region, and this determination result is output to a correction amount adjustment determination unit 2443.

Next, the saturation value S that is received from the saturation calculation unit 2435 is input to a saturation comparison unit 2442, and the saturation comparison unit 2442 compares the input saturation value S and a saturation threshold value (threshold value for the saturation) Th2. In a case where the input saturation value S is greater than or equal to the saturation threshold value Th2, it is determined that the focused region is a high saturation region, whereas in a case where the input saturation value S is less than the saturation threshold value Th2, it is determined that the focused region is a low saturation region, and this determination result is output to the correction amount adjustment determination unit 2443. A specific value example of the saturation threshold value Th2 is Th2=30 in a case of, for example, the pixels of 8-bit gradations. This value can be adjusted based on the color and paleness of a target highlighter or tag and the level of show-through (thinness of the document). For example, the saturation threshold value Th2 can be set and changed by a user via the operation unit 160 or the user PC 20. The variance value threshold value Th1 can also be set and changed by a user via the operation unit 160 or the user PC 20.

The correction amount adjustment determination unit 2443 determines whether the correction amount is to be adjusted using the determination result from the variance value comparison unit 2441 and the determination result from the saturation comparison unit 2442. In the present exemplary embodiment, a determination result that the correction amount is to be adjusted is output with respect to the region that is determined as a low variance value region and a high saturation region. Meanwhile, a determination result that the correction amount is not to be adjusted is output with respect to the other regions (i.e., the region that is determined as a high variance value region or a low saturation region). The determination result is output to the correction amount adjustment unit 2444.

The correction amount adjustment unit 2444 adjusts the luminance value difference (show-through correction amount) input from the subtracter 2440 based on the determination result from the correction amount adjustment determination unit 2443. In the case where the determination result from the correction amount adjustment determination unit 2443 indicates that adjustment is not to be performed, the correction amount adjustment unit 2444 outputs the luminance value difference input from the subtracter 2440 as a final show-through correction amount Dm from the correction amount calculation unit 2438. Meanwhile, in the case where the determination result from the correction amount adjustment determination unit 2443 indicates that adjustment is to be performed, the correction amount adjustment unit 2444 reduces the luminance value difference input from the subtracter 2440 and outputs the reduced luminance value difference as a final show-through correction amount Dm. This processing can be the adjusting of the show-through correction amount to zero or the multiplying of a gain (e.g., a gain of 0.5 or 0.25) to reduce the luminance value difference input from the subtracter 2440. In the case where the show-through correction amount is adjusted to zero, show-through correction is not performed.

In this way, the correction amount is reduced with respect to the region that is determined as a low variance value region and a high saturation region. Since characteristics of a region that is a low variance value region and a high saturation region match characteristics of a highlighter region or a tag region, erroneous correction of the regions and a loss of image data is prevented. Meanwhile, since a region that is determined as a high variance value region or a low saturation region is determined as a correction target, show-through overlapping a high-saturation front surface image is corrected.

The effects will be described below with reference to FIGS. 13A and 13B. First, FIG. 13A is a table illustrating conventional correction execution states without saturation information. In this case, all regions are corrected based on the subtraction processing of the pixel signal Dlut and the pixel signal Dave of the LUT (variance-mean storage unit 2437) regardless of whether the variance value is high or low. In this case, there is a possibility that halftone dots and show-through overlap in a region with a high variance value, and there is a possibility that show-through occurs in a sheet-white region (region that does not overlap halftone dots) in a region with a low variance value. Thus, show-through is suitably corrected in the regions. However, since a region with a low variance value exhibits characteristics similar to those of a highlighter or tag region, the region is corrected based on the LUT, and front surface image data such as a highlighter or tag may be lost.

Next, FIG. 13B is a table illustrating correction execution states in the present exemplary embodiment. In the present exemplary embodiment, the variance value comparison unit 2441 determines whether the variance value is high or low, and the saturation comparison unit 2442 determines whether the saturation is high or low, so that the focused region is discriminated by dividing into four areas as illustrated in FIG. 13B. In this case, a region with a high variance value and high saturation is a halftone dot region with colors, and show-through may overlap in the region, and therefore the region is determined as a target of correction based on the LUT. Next, a region with a high variance value and low saturation is a gray halftone dot region with no colors, and show-through may overlap in the region, and therefore the region is determined as a target of correction based on the LUT. Next, a region with a low variance value and low saturation is a sheet-white region with no halftone dot regions on the front surface, and show-through may overlap in the region, and therefore the region is determined as a target of correction based on the LUT. Meanwhile, a region with a low variance value and high saturation is front surface image data such as a highlighter or tag, so that the correction based on the LUT is weakly performed using the correction amount adjustment unit 2444. As described above, in the present exemplary embodiment, show-through is suitably corrected while only the highlighter or tag regions are excluded from correction targets. Meanwhile, in a case where show-through occurs in a highlighter or tag region, it is difficult to correct only the show-through while retaining the highlighter or tag image data. However, it is desired to enable the show-through correction in an initial setting state (a default is set to an on-state) in order to improve user convenience. The initial setting state is a state after the copying machine is turned on and before a user operation is received, or a state changed in response to the press of a reset button of the operation unit 160, or a state changed in a case where a preset length of time passes in a state where no operations are received from the operation unit 160. In a case where the correction enabled in the initial setting state, the issue that highlighter or tag image data without show-through is lost by erroneous correction is significant, and the prevention of such erroneous correction as in the present exemplary embodiment is important.

Next, a correction processing unit 2439 performs show-through correction processing on the pixel signal Dg input based on the correction amount received from the correction amount calculation unit 2438. In the show-through correction processing, for example, the correction amount is added to the luminance value of the pixel signal Dg (the luminance value is increased) to increase the brightness of the pixel signal Dg. In a case where the input pixel signal Dg is a pixel signal without show-through, the difference is small, and the correction amount is small. Alternatively, the correction can be performed by multiplying a gain based on the input pixel signal value, instead of simply adding the correction amount. For example, the brighter the input pixel signal value is, the more the show-through is affected. Thus, a gain can be multiplied to correct a brighter pixel signal more strongly based on the brightness of the pixel signal. The corrected pixel signal value is written as the pixel signal Du back to the RAM 2110.

Figure 10:
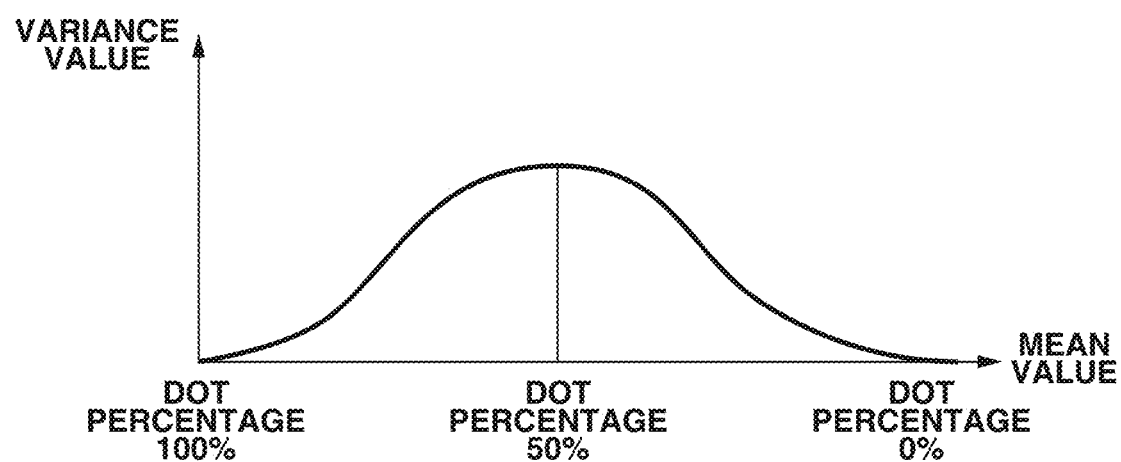
FIG. 10 is a graph illustrating a relationship between dot percentages, variance values, and mean values of a halftone dot image according to one or more aspects of the present disclosure.

Further, the variance value of the read halftone dot image has a peak of a maximum value at a dot percentage of 50% in the focused region (window size), and the distribution at 50% or higher and the distribution at less than 50% are similar. The minimum value of the variance value is at a dot percentage of 0% or 100%. This is illustrated in FIG. 10. In FIG. 10, the same variance value occurs at different mean values. In this case, the target of the show-through correction processing can be the dot percentages that are less than 50%. Specifically, the mean value densities that are less than or equal to an intermediate density can be determined as a target and corrected. This is because the density of the front surface is high at the intermediate density or higher and is less likely to be affected by show-through. In this way, the relationship between the variance value and the mean value becomes unique. In another configuration, a gain that decreases the correction amount in a case where the density is 50% or higher can be employed. The processing based on the amount of halftone dots is implemented to the correction processing unit 2439.

In the present exemplary embodiment, the processing is performed separately for each color. Thus, the variance-mean storage unit 2437 stores the mean value for each variance value separately for each color. Since the mean value for each color is separately stored, color show-through components (e.g., show-through components of red characters) can also be corrected.

FIG. 9 illustrates an example of a LUT in the variance-mean storage unit 2437. The first line shows the address of the LUT, and the second line shows the data stored in the LUT. The address of the LUT is the variance value but can be substituted by a standard deviation ($\sigma$) to decrease the numerical value. Like the variance value, the numerical value of the standard deviation indicates the dispersion.

The relationship between the variance value and the mean value that are stored in the LUT will be described below. For example, a variance value of zero (address 0) indicates either a solidly shaded portion or sheet-white portion in a halftone dot image in a case where effects of show-through are not considered. Since the mean value stored in the LUT is the mean value of the highest (brightest) numerical value in the image, the mean value stored in the address of the variance value of zero is inevitably the mean value of the sheet-white. Since, with increase in the variance value (address), the number of pixels of halftone dots in the image increases, the stored mean value (luminance data) decreases (darker). Thus, the data stored in the respective addresses of the LUT after reference to one page of an image are the values specified in FIG. 9.

Further, in a case where there is not a halftone dot image but a highlighter or tag image, the highlighter or tag image may exhibit a variance value of zero as in a sheet-white portion. In this case, in a case where the correction based on the LUT is performed, the highlighter or tag image may be corrected erroneously to be close to the luminance value of the sheet-white that is stored in the LUT. However, in the present exemplary embodiment, the operation of the correction amount adjustment unit 2444 prevents such erroneous correction.

<Flowchart of Show-Through Correction Processing>

Figure 11:
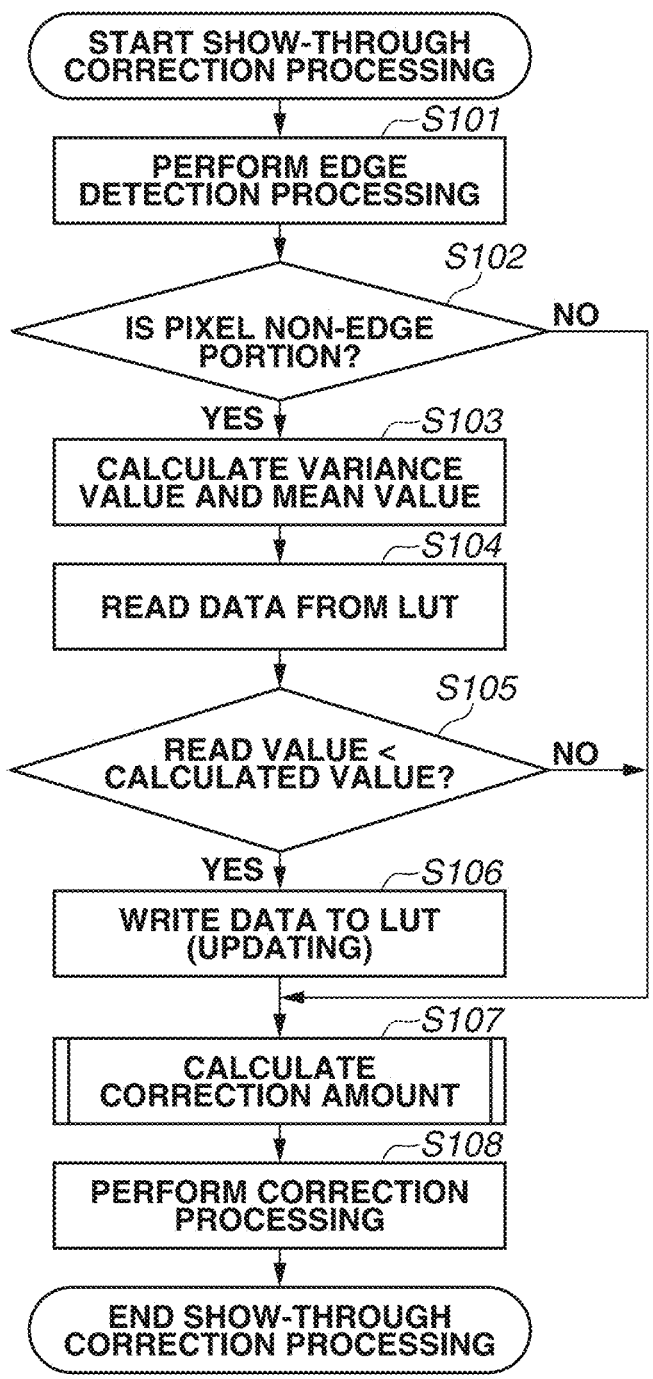
FIG. 11 is a flowchart illustrating a process of show-through correction according to one or more aspects of the present disclosure.

FIG. 11 is a flowchart illustrating a process of show-through correction by the copying machine according to the first exemplary embodiment. The CPU 2100 controls the scanner IF image processing unit 2400 (especially the show-through correction processing unit 2430) while controlling the scanner 140 based on a program stored on the HDD 2130 to read an image on the document 100, to execute the flowchart.

First, in step S101, the CPU 2100 performs edge detection processing on the read image. The edge detection processing is executed by the edge determination unit 2434, and the edge determination unit 2434 refers to a window (output by the buffer 2431) with a focused pixel of an image being a center of the window and performs edge detection using a publicly-known technique.

In step S102, the CPU 2100 refers to the result of the edge determination in step S101 and determines whether the focused pixel is an edge portion. In a case where the CPU 2100 determines that the focused pixel is an edge portion (NO in step S102), the processing proceeds to step S107. Meanwhile, in a case where the focused pixel is not an edge (YES in step S102), the processing proceeds to step S103.

In step S103, the CPU 2100 calculates a variance value and a mean value. The calculation is performed by the variance value calculation unit 2432 and the mean value calculation unit 2433, and the variance value calculation unit 2432 and the mean value calculation unit 2433 refer to the window (output by the buffer 2431) with the focused pixel of the read image being the center of the window and calculate the variance value and the mean value.

In step S104, the variance-mean storage unit 2437 reads data from the LUT. The reading is performed by the variance-mean storage control unit 2436, and the address of the LUT to be read is the same as the variance value calculated in step S103. The read data is show-through correction information.

In step S105, the CPU 2100 compares the value read in step S104 and the mean value calculated in step S103 to determine which one of the read value and the calculated mean value is greater than the other. In a case where the value read in step S104 is greater than or equal to the mean value calculated in step S103 (NO in step S105), the processing proceeds to step S107. Meanwhile, in a case where the value read in step S104 is less than the mean value calculated in step S103 (YES in step S105), the processing proceeds to step S106.

In step S106, data is written to the LUT of the variance-mean storage unit 2437. The written data is the mean value calculated in step S103, and the written address is the variance value calculated in step S103.

Next, in step S107, the CPU 2100 calculates a correction amount for show-through. The calculation is performed mainly by the saturation calculation unit 2435 and the correction amount calculation unit 2438. Details thereof will be described below.

In step S108, the CPU 2100 performs show-through correction processing on an input pixel (the focused pixel in step S101). The show-through correction processing is performed by the correction processing unit 2439 and, for example, the correction amount calculated in step S107 is added to the signal value (luminance value) of the input pixel to increase the brightness of the pixel signal Dg. Further, the signal value of the input pixel can be multiplied by a gain corresponding to the correction amount.

Then, the flowchart of the show-through correction processing is ended.

<Flowchart of Correction Amount Calculation Processing>

Figure 12:
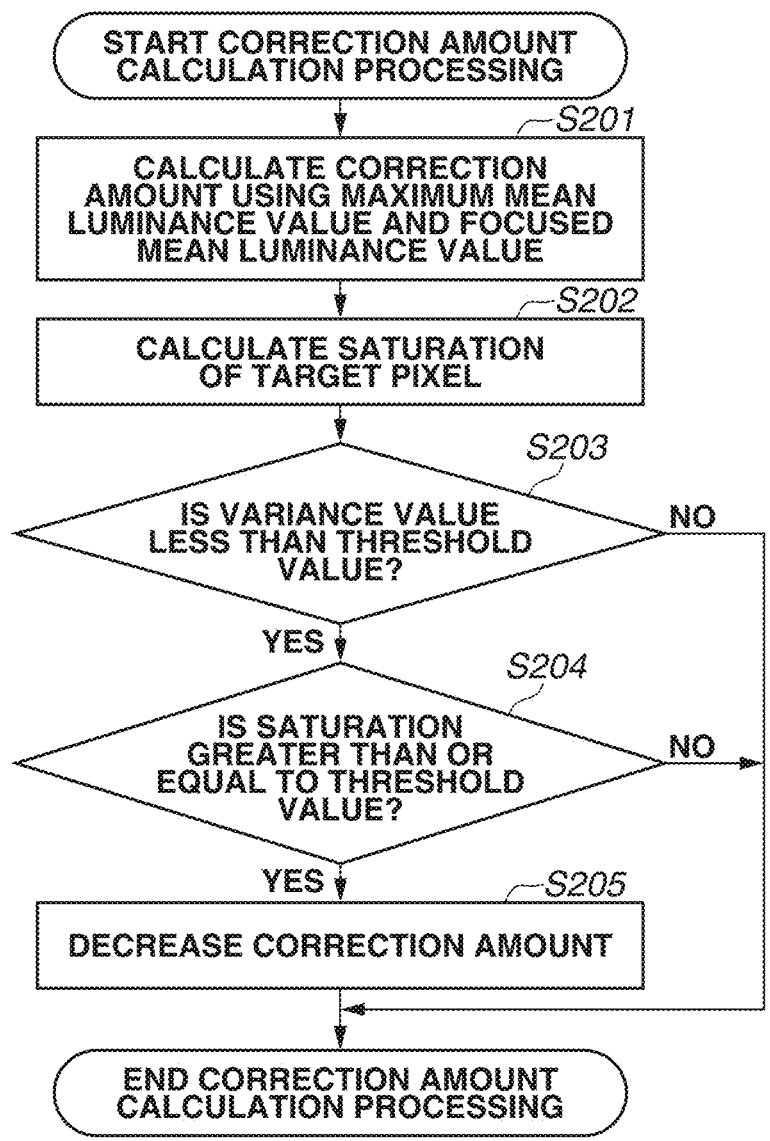
FIG. 12 is a flowchart illustrating an example of a process of correction amount calculation according to one or more aspects of the present disclosure.

FIG. 12 is a flowchart illustrating a process of show-through correction amount calculation according to the present exemplary embodiment. The CPU 2100 controls the show-through correction processing unit 2430 (especially the saturation calculation unit 2435 and the correction amount calculation unit 2438) based on a program stored on the HDD 2130, to execute the flowchart.

In step S201, the CPU 2100 calculates a correction amount using a maximum mean luminance value and a focused mean luminance value (pixel signal Dave). The maximum mean luminance value is a value (pixel signal Dlut) read from the LUT. The correction amount is calculated by the subtracter 2440 of the correction amount calculation unit 2438.

Next, in step S202, the CPU 2100 calculates (specifies) the saturation of the currently-focused target pixel. The saturation is calculated from the color component values R, G, and B of the pixel signal Dg by the saturation calculation unit 2435 using Formula (3).

Next, in step S203, the CPU 2100 determines whether the variance value calculated in step S103 in FIG. 11 using the variance value calculation unit 2432 is less than a threshold value. The determination is performed by the variance value comparison unit 2441, and the variance value and the variance value threshold value Th1 are compared. In a case where the CPU 2100 determines that the calculated variance value is not less than the threshold value (NO in step S203), the process in the flowchart is ended, and as a result, the correction amount calculated in step S201 is the final correction amount Dm output from the correction amount calculation unit 2438, Meanwhile, in a case where the CPU 2100 determines that the calculated variance value is less than the threshold value (YES in step S203), the processing proceeds to step S204.

Next, in step S204, the CPU 2100 determines whether the saturation calculated in step S202 is greater than or equal to threshold value. The determination is performed by the saturation comparison unit 2442, and the saturation and the saturation threshold value Th2 are compared. In a case where the CPU 2100 determines that the calculated saturation is less than the threshold value (NO in step S204), the process in the flowchart is ended, and as a result, the correction amount calculated in step S201 is the final correction amount Dm output from the correction amount calculation unit 2435. Meanwhile, in a case where the calculated saturation is greater than or equal to the threshold value (YES in step S204), the processing proceeds to step S205.

Next, in step S205, the CPU 2100 decreases the correction amount calculated in step S201. Specifically, the CPU 2100 sets the correction amount to be smaller in the case where the processing proceeds through step S205 than that in the case where the processing does not proceed through step S205. This processing is performed by the correction amount adjustment unit 2444 on the region that is determined as a region with the variance value less than the threshold value and with the saturation greater than or equal to the saturation threshold value in steps S203 and S204. The processing can be the adjusting of the show-through correction amount to zero or the multiplying of a gain (e.g., a gain of 0.5 or 0.25) to reduce the luminance value difference input from the subtracter 2440. As described above, a region with a low variance value and high saturation is likely to be image data that is not show-through, such as a highlighter or tag, and the processing prevents the data from being lost by erroneous correction. Furthermore, since the correction amount calculated in step S201 is applied to the other regions, the show-through correction is suitably performed.

According to the present exemplary embodiment, a highlighted image on the front surface that has a high saturation, does not have a halftone dot structure, and has a relatively low density, such as a tag or highlighter, is discriminated, excluded from show-through correction targets, and retained. Furthermore, only show-through components are removed from show-through that occurs and overlaps an image on the front surface. Therefore, the above-described both advantages are produced.

Second Exemplary Embodiment

In the first exemplary embodiment, the method and configuration for calculating the saturation from the focused pixel are described.

However, in the case of a halftone dot structure, the saturation calculation result may vary significantly even in the same halftone dot region depending on whether the focused pixel is a dot portion of halftone dots or not (i.e., the focused pixel is a space between dots). In a second exemplary embodiment, a description will be given of a method and configuration for obtaining saturation calculation results that are similar results at anywhere in the same halftone dot region.

The present exemplary embodiment is different from the first exemplary embodiment in the internal configuration of the show-through correction processing unit 2430. The external view of the copying machine and the configurations of the scanner 140, the scanner IF image processing unit 2400, and the controller 200 are similar to those in the first exemplary embodiment. The difference between the present exemplary embodiment and the first exemplary embodiment will be described in detail below.

<Show-Through Correction Processing Unit>

FIG. 14 is a block diagram illustrating a configuration of a show-through correction processing unit 3430 according to the second exemplary embodiment.

Internal blocks 3431 to 3439 are similar to those in the first exemplary embodiment. The difference is the connection of a saturation calculation unit 3435.

In the second exemplary embodiment, the saturation calculation unit 3435 receives a mean value Dave of a current focused region that is output from a mean value calculation unit 3433 as input. Then, the saturation value S is calculated by subtracting the minimum value of R, G, and B values that are color component values of the mean value Dave from the maximum value of the R, G, and B values. Formula (4) is specified below.

$$\text{Saturation }(S) = \max(\text{Rave, Gave, Bave}) - \min(\text{Rave, Gave, Bave}) \quad \text{Formula (4)},$$

where max(Rave, Gave, Bave) is the value of R-, G-, and B-components of the mean value Dave of the target region that has the highest luminance, and min(Rave, Gave, Bave) is the value of R-, G-, and B-components of the mean value Dave of the target region that has the lowest luminance.

The mean value Dave is the mean value of the plurality of pixels of the target region (a 5×5 or 7×7 window formed by the buffer 3431) and is calculated by Formula (2). Thus, in a case where the target region is a halftone dot region, luminance values of dot portions and spaces between dots of halftone dots are averaged, and therefore calculated saturations are less likely to vary. Further, effects of impurity dots, such as dirt and dust, and luminance unevenness in read data are reduced. Thus, the saturation is calculated more suitably than in the first exemplary embodiment.

Further, in order to share the buffer 3431 and reduce implementation costs, results of calculation by the mean value calculation unit 3433 are used in the saturation calculation in the present exemplary of embodiment. In other words, the saturation is calculated using the same window region as that in the variance value calculation, mean value calculation, and edge determination. Alternatively, the size of the window region for use in the saturation calculation can be changed from the size of the window region for use in the variance value calculation, mean value calculation, and edge determination by changing the size of the buffer 3431. In this way, the saturation is determined from a broader range, and the calculation accuracy can be more increased.

By the foregoing configuration and processing according to the present exemplary embodiment, the saturation in close values can be calculated as appropriate at anywhere in the same halftone dot region. Further, the saturation can be calculated with less effects of impurities, such as dirt and dust.

Third Exemplary Embodiment

In the first and second exemplary embodiments, the methods and configurations for show-through correction at constantly the same level are described.

In a third exemplary embodiment, a description will be given of a method and configuration by which a user can adjust the level of show-through correction by operating the copying machine.

The difference between the present exemplary embodiment and the first and second exemplary embodiments is a flowchart of show-through correction processing. The external view of the copying machine and the configurations of the scanner 140, the scanner IF image processing unit 2400, the controller 200, and a show-through correction unit are similar to those in the first and second exemplary embodiments. The difference between the present exemplary embodiment and the first and second exemplary embodiments will be described in detail below.

<Show-Through Correction Level Setting>

Figure 15:
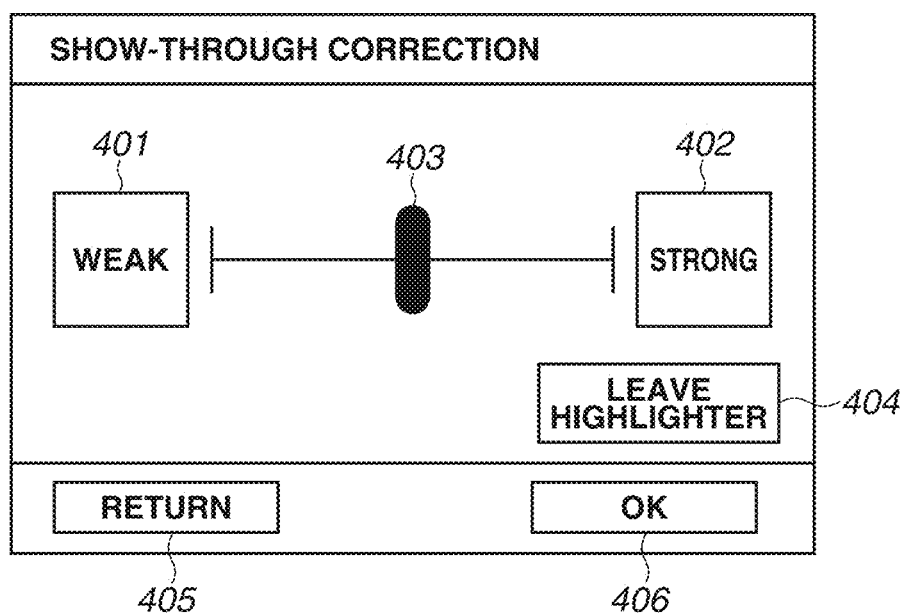
FIG. 15 is a diagram illustrating an example of a show-through correction setting on a screen of an operation unit according to one or more aspects of the present disclosure.

FIG. 15 illustrates a screen that a user operates to set the show-through correction level. The screen is on the operation unit 160, and the user of the copying machine can adjust the show-through correction level by operating the screen. While the show-through correction level has three levels that are weak, intermediate, and strong in the present exemplary embodiment, the number of levels is not limited to three. In a case where the show-through correction level is to be controlled more finely, the number of levels can be four or five. A show-through correction level setting bar 403 shows the current setting and is moved to the left at the press of a weak button 401 or to the right at the press of a strong button 402. A state where the bar 403 is at the leftmost position is the show-through correction level "weak". A state where the bar 403 is at the middle is the show-through correction level "intermediate". A state where the bar 403 is at the rightmost position is the show-through correction level "strong". Further, the correction setting can be set in such a manner that a highlighter is retained at the press of a leave-highlighter button 404 regardless of the show-through correction level. For example, in a case where the leave-highlighter button 404 is not pressed and the correction level is set to strong, a concern arises that highlighter image data may be lost in correcting the show-through that overlaps a highlighter region. By pressing the leave-highlighter button 404, the user can select the setting to prioritize retention of the highlighter over show-through correction in the highlighter region. After the bar 403 is moved to the position of a desired show-through correction level and an OK button 406 is pressed in this state, the corresponding show-through correction level is set. For example, in a case where the weak button 401 is pressed once in the state illustrated in FIG. 15 and the OK button 406 is pressed with the bar 403 at the leftmost position, the show-through correction level is set to weak. In a case where a return button 405 is pressed, the show-through correction level setting is ended without changing the show-through correction level.

<Flowchart of Show-Through Correction Processing>

Figure 16:
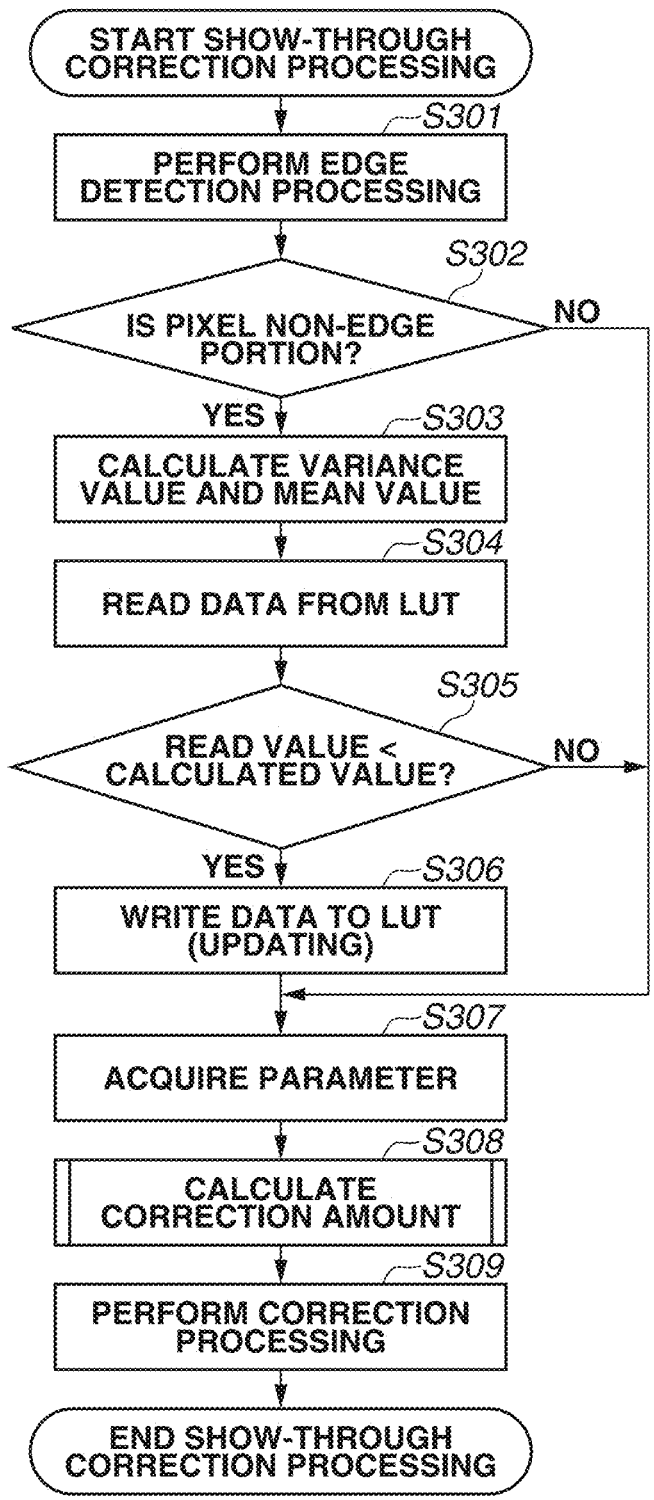
FIG. 16 is a flowchart illustrating a process of show-through correction according to one or more aspects of the present disclosure.

FIG. 16 is a flowchart illustrating a process of correction amount calculation according to the third exemplary embodiment. The CPU 2100 controls the show-through correction processing unit 2430 based on a program stored on the HDD 2130, to execute the flowchart. How the correction processing is changed based on the show-through correction level setting in FIG. 15 will be described in detail below with reference to the flowchart.

First, steps S301 to S306 are similar to steps S101 to S106 in FIG. 11 according to the first exemplary embodiment, and therefore the redundant descriptions thereof are omitted.

Next, in step S307, a show-through correction parameter is acquired. The show-through correction parameter is a parameter that is determined based on the show-through correction level setting set by the user by operating the screen in FIG. 15. In the present exemplary embodiment, the show-through correction parameter indicates two types that are a correction amount parameter and a highlighter flag. The correction amount parameter is used in adjusting the correction amount based on the show-through level in step S309 described below. Further, the highlighter flag is used in the correction amount calculation processing in step S308. The highlighter flag is TRUE in a case where the leave-highlighter button 404 is pressed, whereas the highlighter flag is FALSE in a case where the leave-highlighter button 404 is not pressed.

Next, in step S308, the correction amount calculation processing is performed. The correction amount calculation processing is basically the same as the processing in FIG. 12 according to the first exemplary embodiment, except that the CPU 2100 refers to the highlighter flag in the processing of decreasing the correction amount in step S205. In this processing, the CPU 2100 refers to the highlighter flag that is a show-through correction parameter, and in a case where the highlighter flag is TRUE, the processing of decreasing the correction amount is performed in the present exemplary embodiment as in the first exemplary embodiment. Meanwhile, in a case where the highlighter flag is FALSE, the processing of decreasing the correction amount is not performed in step S205. The processing in the case where the highlighter flag is FALSE corresponds to the conventional correction processing in which the saturation is not used in show-through correction, and show-through correction in the highlighter region is prioritized over retention of the highlighter.

Next, in step S309, the show-through correction processing is performed on the input pixel. The show-through correction processing is performed by the correction processing unit 2439 and, for example, the correction amount calculated in step S308 is added to the signal value (luminance value) of the input pixel to increase the brightness of the pixel signal Dg. In this processing, the correction amount parameter that is a show-through correction parameter is used, not as in the first exemplary embodiment.

The correction amount parameter is a value for controlling the correction amount of each pixel of show-through portions based on the show-through correction level. Specifically, the correction amount parameter is a value that indicates a percentage of the correction amount to be added to the target pixel. For example, in a case where the show-through correction level is set to weak and 20% of the correction amount is to be added to the RGB values of the target pixel, the correction amount parameter has a value of 0.2. Similarly, in a case where the show-through correction level is set to intermediate, the correction amount parameter is 0.6. In a case where the show-through correction level is set to strong, the correction amount parameter is 1.0. The value differences are the differences in processing between the cases where the show-through removal level is set to strong, where the show-through removal level is set to intermediate, and where the show-through removal level is set to weak, and this leads to control of the level of correction of show-through portions and its effect on portions other than the show-through portions. Formula (5) of the correction processing is as follows.

$$Du = Dg + (M \times Dm) \quad \text{Formula (5),}$$

where Du is the corrected pixel output from the show-through correction unit, Dg is the pixel before correction that is input to the show-through correction unit, M is the correction amount parameter, and Dm is the correction amount calculated by the correction amount calculation unit.

In the first and second exemplary embodiments, the show-through correction is performed at constantly the same level, such as the correction amount parameter of 1.0.

While the value of the correction amount parameter is changed by setting the show-through correction level to weak, intermediate, or strong in the present exemplary embodiment, the variance value threshold value Th1 and the saturation threshold value Th2 can be changed based on an instruction from the operation unit 160 or the user PC 20 in another exemplary embodiment. In this case, the leave-highlighter button 404 can be excluded from the operation screen in FIG. 15.

With the configuration and processing according to the present exemplary embodiment, a user can adjust the show-through correction level by operating the copying machine. Thus, show-through is corrected as desired by the user according to the present exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits(e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-230916, filed Dec. 20, 2019, which is hereby incorporated by reference herein in its entirety.

What is claimed is:

1. An image processing apparatus comprising:
one or more processors or one or more circuits that cause the image processing apparatus to function as:
a first determination unit that determines whether a pixel of a target region in an input image acquired by reading a document is a pixel of a halftone dot region;
a specifying unit that specifies a value based on a saturation of the pixel of the target region;
a second determination unit that determines whether the value specified by the specifying unit is less than a predetermined value; and
an increasing unit that increases a luminance value of the pixel of the target region based on a first correction amount in a case where the first determination unit determines that the pixel of the target region is not the pixel of the halftone dot region and the second determination unit determines that the value specified by the specifying unit is less than the predetermined value,
wherein the increasing unit increases the luminance value of the pixel of the target region based on a second correction amount less than the first correction amount in a case where the first determination unit determines that the pixel of the target region is not the pixel of the halftone dot region and the second determination unit determines that the value specified by the specifying unit is greater than or equal to the predetermined value.

2. The image processing apparatus according to claim 1, wherein in a case where the first determination unit determines that the pixel of the target region is the pixel of the halftone dot region, the luminance value of the pixel of the target region is increased based on the first correction amount.

3. The image processing apparatus according to claim 1, wherein the first determination unit determines whether the pixel of the target region is the pixel of the halftone dot region based on a dispersion of a signal value of a plurality of pixels of the target region in the input image.

4. The image processing apparatus according to claim 3, wherein in a case where the dispersion of the signal value of the plurality of pixels of the target region in the input image is greater than or equal to a predetermined dispersion, the first determination unit determines that the pixel of the target region is the pixel of the halftone dot region, and
wherein in a case where the dispersion of the signal value of the plurality of pixels of the target region in the input image is less than the predetermined dispersion, the first determination unit determines that the pixel of the target region is not the pixel of the halftone dot region.

5. The image processing apparatus according to claim 1, wherein the predetermined value is changed by a user.

6. The image processing apparatus according to claim 1, further comprising:
a reader that reads a document,
wherein the first determination unit determines whether the pixel in the input image acquired by reading the document by the reader is the pixel of the halftone dot region.

7. The image processing apparatus according to claim 6, further comprising a printer that prints an image of the document read by the reader.

8. The image processing apparatus according to claim 6, further comprising an interface that transmits an image of the document read by the reader.

9. An image processing apparatus comprising:
one or more processors or one or more circuits that cause the image processing apparatus to function as:
a first determination unit that determines whether a pixel of a target region in an input image acquired by reading a document is a pixel of a halftone dot region;
a specifying unit that specifies a saturation of the pixel of the target region;

a second determination unit that determines whether the saturation specified by the specifying unit is less than a predetermined value; and an increasing unit that increases a luminance value of the pixel of the target region based on a first correction amount in a case where the first determination unit determines that the pixel of the target region is not the pixel of the halftone dot region and the second determination unit determines that the saturation specified by the specifying unit is less than the predetermined value, wherein the increasing unit increases the luminance value of the pixel of the target region based on a second correction amount less than the first correction amount in a case where the first determination unit determines that the pixel of the target region is not the pixel of the halftone dot region and the second determination unit determines that the saturation specified by the specifying unit is greater than or equal to the predetermined value.

10. An image processing apparatus comprising:

one or more processors or one or more circuits that cause the image processing apparatus to function as:

a first determination unit that determines whether a pixel of a target region in an input image acquired by reading a document is a pixel of a halftone dot region;

a specifying unit that specifies a value based on a saturation of the pixel of the target region;

a second determination unit that determines whether the value specified by the specifying unit is less than a predetermined value; and an increasing unit that increases a luminance value of the pixel of the target region in a case where the first determination unit determines that the pixel of the target region is not the pixel of the halftone dot region and the second determination unit determines that the value specified by the specifying unit is less than the predetermined value, wherein the increasing unit does not increase the luminance value of the pixel of the target region in a case where the first determination unit determines that the pixel of the target region is not the pixel of the halftone dot region and the second determination unit determines that the value specified by the specifying unit is greater than or equal to the predetermined value.

11. A method of controlling an image processing apparatus, the method comprising:

determining, as a first determination, whether a pixel of a target region in an input image acquired by reading a document is a pixel of a halftone dot region;

specifying a value based on a saturation of a pixel of the target region;

determining, as a second determination, whether the specified value is less than a predetermined value;

increasing a luminance value of the pixel of the target region based on a first correction amount in a case where the first determination determines that the pixel of the target region is not the pixel of the halftone dot region and the second determination determines that the specified value is less than the predetermined value; and increasing the luminance value of the pixel of the target region based on a second correction amount less than the first correction amount in a case where the first determination determines that the pixel of the target region is not the pixel of the halftone dot region and the second determination determines that the specified value is greater than or equal to the predetermined value.

12. A non-transitory computer-readable storage medium storing a program that causes a computer to execute a method of controlling an image processing apparatus, the method comprising:

determining, as a first determination, whether a pixel of a target region in an input image acquired by reading a document is a pixel of a halftone dot region;

specifying a value based on a saturation of a pixel of the target region;

determining, as a second determination, whether the specified value is less than a predetermined value;

increasing a luminance value of the pixel of the target region based on a first correction amount in a case where the first determination determines that the pixel of the target region is not the pixel of the halftone dot region and the second determination determines that the specified value is less than the predetermined value; and increasing the luminance value of the pixel of the target region based on a second correction amount less than the first correction amount in a case where the first determination determines that the pixel of the target region is not the pixel of the halftone dot region and the second determination determines that the specified value is greater than or equal to the predetermined value.

* * * * *